US012601457B2

(12) United States Patent
Holtrup et al.

(10) Patent No.: US 12,601,457 B2
(45) Date of Patent: Apr. 14, 2026

(54) HEAD LIGHT ASSEMBLY AND METHOD FOR ASSEMBLING

(71) Applicant: Lumileds LLC, San Jose, CA (US)

(72) Inventors: Matthias Holtrup, Aachen (DE); Marc Droegeler, Aachen (DE)

(73) Assignee: Lumileds Singapore Pte. Ltd., Singapore (SG)

( * ) Notice: Subject to any disclaimer, the term of this patent is extended or adjusted under 35 U.S.C. 154(b) by 0 days.

(21) Appl. No.: 18/998,905

(22) PCT Filed: Aug. 2, 2023

(86) PCT No.: PCT/US2023/029303

§ 371 (c)(1),
(2) Date: Jan. 27, 2025

(87) PCT Pub. No.: WO2024/030487

PCT Pub. Date: Feb. 8, 2024

(65) Prior Publication Data

US 2026/0043531 A1 Feb. 12, 2026

Related U.S. Application Data

(60) Provisional application No. 63/394,838, filed on Aug. 3, 2022.

(51) Int. Cl.

| | |
|---|---|
| ***F21S 41/39*** | (2018.01) |
| ***F21S 41/141*** | (2018.01) |
| *F21Y 115/10* | (2016.01) |

(52) U.S. Cl.

CPC ............ *F21S 41/39* (2018.01); *F21S 41/141* (2018.01); *F21Y 2115/10* (2016.08)

(58) Field of Classification Search

CPC .......... F21S 41/39; F21S 41/141; F21S 41/30; F21S 41/00; F21S 41/19; F21S 41/196;
(Continued)

(56) References Cited

U.S. PATENT DOCUMENTS

| | | | |
|---|---|---|---|
| 2015/0219297 | A1 | 8/2015 | Jackl et al. |
| 2015/0338049 | A1 | 11/2015 | Cabanne et al. |

(Continued)

FOREIGN PATENT DOCUMENTS

| | | |
|---|---|---|
| DE | 202018107292 U1 | 3/2020 |

*Primary Examiner* — Bao Q Truong
(74) *Attorney, Agent, or Firm* — Volpe Koenig

(57) ABSTRACT

A method of assembling a headlamp includes inserting a spring (205) into spring-receiving openings (211*a*, 211*b*) in side walls (207*a*, 207*b*) or other structures projecting vertically from opposing sides of a base (202) of an LED module (200) so that opposing end portions of the spring (221*a*, 221*b*) project in opposite directions from the side walls (207*a*, 207*b*). Spring-engaging slots (311*a*, 311*b*) formed in brackets (307*a*, 307*b*) extending from opposing sides of a platform (303) of a reflector carrier (300) engage the opposing spring end portions (221*a*, 221*b*). A deforming force is applied to the spring end portions (221*a*, 221*b*) via the spring-engaging slots (311*a*, 311*b*) until a front edge of the reflector carrier (340) passes over tops of pins (213*a*, 213*b*) projecting vertically from the base (202) of the LED module (200). A vertical separation between the front edge of the base of the LED module (200) is decreased until the front edge (205) is below the tops of the pins (213*a*, 213*b*).

20 Claims, 7 Drawing Sheets

(58) Field of Classification Search
CPC ........ F21Y 2115/10; F21V 7/00; F21V 17/00; F21V 17/10; F21V 17/16; F21V 19/00; F21V 19/004
See application file for complete search history.

(56) References Cited

U.S. PATENT DOCUMENTS

| | | | | |
|---|---|---|---|---|
| 2018/0031194 | A1 | 2/2018 | Seiger et al. | |
| 2018/0058639 | A1 | 3/2018 | Blusseau | |
| 2019/0211990 | A1* | 7/2019 | Matsumoto ............. | F21S 41/00 |
| 2019/0383472 | A1 | 12/2019 | Mertens et al. | |
| 2020/0182438 | A1 | 6/2020 | Holtrup et al. | |

* cited by examiner

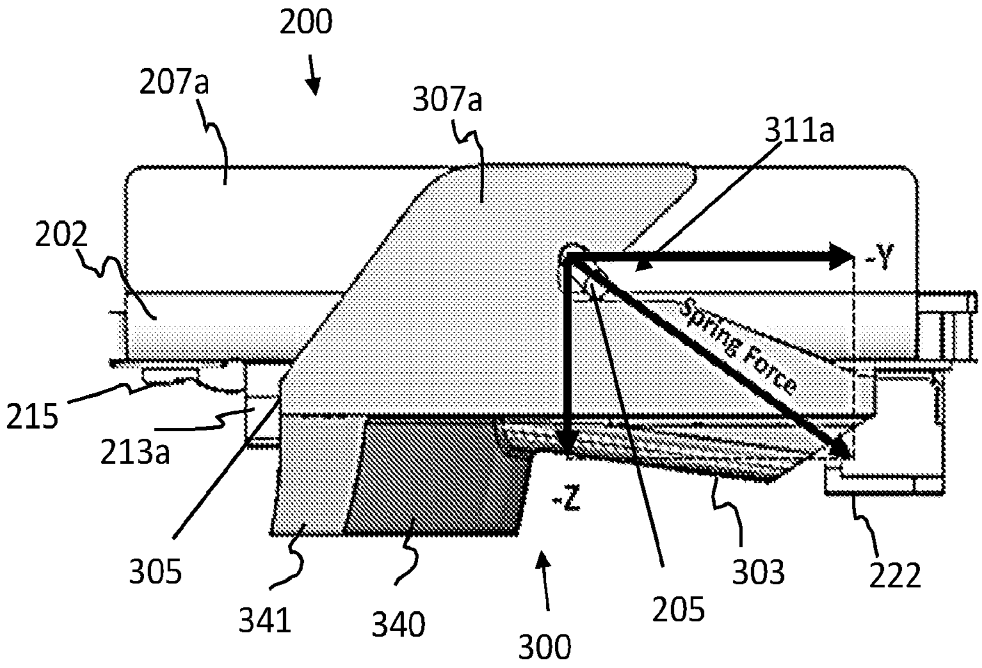
FIG. 10
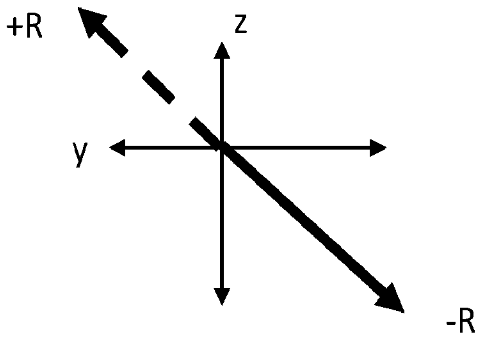

HEAD LIGHT ASSEMBLY AND METHOD FOR ASSEMBLING

CROSS-REFERENCE TO RELATED APPLICATIONS

This application is a § 371 application of International Application No. PCT/US2023/029303, filed Aug. 2, 2023, which claims the benefit of U.S. Provisional Application No. 63/394,838, filed Aug. 3, 2022, which are incorporated by reference as if fully set forth.

BACKGROUND

Automotive headlamps typically include a lamp secured to a lamp support structure and a reflector configured to collect light from the lamp and make it available to form the headlamp beam. Light emitting diodes (LEDs) are increasingly used as lamp components in automotive headlamps. In an LED headlamp, an LED emitter and LED supporting components can be mounted on one or more printed circuit boards or another structural component such as a heat sink or the like. The circuit boards can be secured to a support structure to form an integrated LED module. The reflector can be carried on a reflector carrier. The LED module can be assembled to the reflector carrier to provide an LED headlamp assembly. In a known assembly approach, the reflector carrier and the LED module are affixed to one another using conventional affixing means such as a screw, heat stacking, or the like. However, conventional affixing mechanisms have disadvantages when applied to assembly of LED headlamps.

SUMMARY

A method of assembling a headlamp includes inserting a spring into spring-receiving openings in side walls or other structures projecting vertically from opposing sides of a base of an LED module so that opposing end portions of the spring project in opposite directions from the side walls. Spring-engaging slots formed in brackets extending from opposing sides of a platform of a reflector carrier engage the opposing spring end portions. A deforming force is applied to the spring end portions via the spring-engaging slots until a front edge of the reflector carrier passes over tops of pins projecting vertically from the base of the LED module. A vertical separation between the front edge of the base of the LED module is decreased until the front edge is below the tops of the pins.

BRIEF DESCRIPTION OF THE DRAWINGS

A more detailed understanding can be had from the following description, given by way of example in conjunction with the accompanying drawings wherein:

FIG. 10 is a force diagram of the headlamp assembly shown in FIG. 2.

DETAILED DESCRIPTION

Figure 1A:
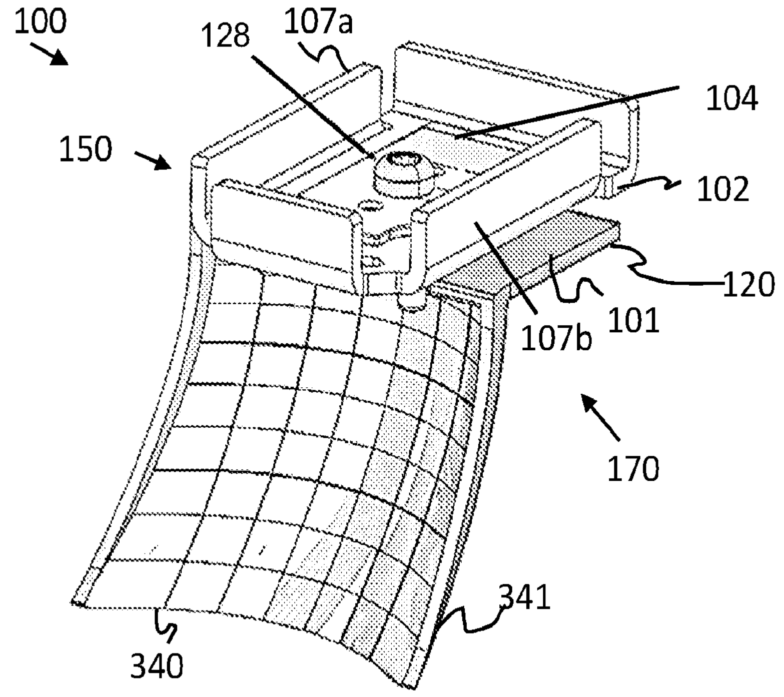
FIG. 1A is a perspective view of a headlamp assembly showing one end of an affixing mechanism that couples an LED module to a reflector carrier of the headlamp assembly.

Examples of different light illumination systems and/or light emitting diode ("LED") implementations will be described more fully hereinafter with reference to the accompanying drawings. It will be understood the drawings are not to scale. Some features may be exaggerated in size with respect to other features to facilitate description of various structural details in the illustrated examples. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

In a conventional headlamp assembly approach, a reflector carrier is coupled to an LED module using conventional affixing means, such as a screw, heat stacking, or the like.

However, conventional affixing mechanisms have disadvantages in LED headlamps. For example, tightening a screw incurs a risk of rotating or displacing the reflector carrier with respect to the LED module by the torque applied to the screw head. Installing a screw requires a separate step and further requires screw installing equipment such as a power screw driver, heat stacking equipment, jigs, placement holders, etc. Further, a screw requires a screw dome to cap the sharp end, which takes up space on the module. Typical headlamp assemblies have space constraints which present accessibility challenges when manual or automatic tools are used to perform the assembly. Conventional assembly methods require a dedicated assembly step.

The structures and assembly method described herein may provide more flexibility when designing a reflector carrier. Moreover, the coupling method described herein can compensate thermal expansion that can create structural problems in the interface between the LED module and the reflector carrier. According to the methods described herein, the assembly can be completed manually without using any tools.

FIG. 1A is a perspective view of a headlamp assembly 100 that includes an LED module 150 and a reflector carrier 170 assembled using a screw 128. LED module 150 includes a planar base 102 having an underside surface 104 and a top surface (not visible) upon which one or more circuit boards (not visible) can be mounted. Opposing side walls 107*a*, 107*b* may extend from planar base 102 perpendicular to the plane in which planar base 103 lies.

Reflector carrier 170 includes a platform 120 bearing an optical component 340 supported in a frame 341. A bottom surface 101 of platform 120 is affixed to top surface (not shown) of LED module 150 by means of a screw 128. In an assembly method using a screw, reflector carrier 170 is assembled to LED module 150 by first bringing bottom surface 101 of platform 120 into contact with top surface (not shown) of LED module 150. The contact is maintained while a torque applying means such as a screwdriver engages screw head 129 at one end of screw 128. Torque may then be applied to a screw head of screw 128 to advance screw 128 through planar base 102 and through platform 120 until the sharp end (not shown) of screw 128 protrudes from top surface 99 (best shown in FIG. 1B) of platform 120.

Screws are simple attachment means widely used in assembly of a wide range of structures. However, there are disadvantages to using screws to couple components of an LED headlamp assembly. For example, there is a risk that torque applied to rotate screw 128 will act to rotate base 102 of LED module 150 with respect to platform 120 of reflector carrier 340. Further, assembly of structures using screws may require special assembling equipment such as a power screw driver, heat stacking equipment, jigs, placement holders, or the like. The screwing process itself is a dedicated assembly step that is performed in addition to the assembly steps of bringing platform 170 into contact LED module 150 and securing the contact. These preliminary steps must be performed before the screwing step can be performed.

Figure 1B:
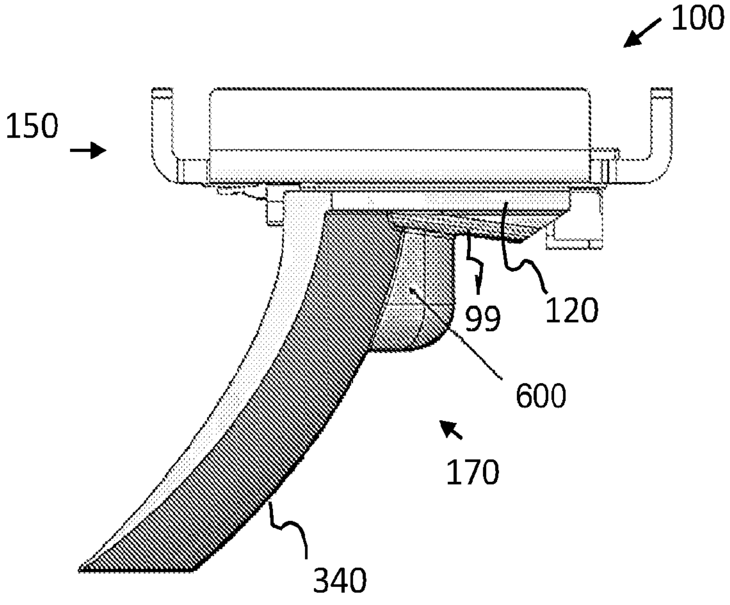
FIG. 1B is a perspective view of the headlamp assembly of FIG. 1A from a side showing the other end of the affixing mechanism shown in FIG. 1A.

FIG. 1B is a perspective view of the headlamp assembly of FIG. 1A. A dome 600 is shown to enclose the sharp end of screw that protrudes from top surface 99 of platform 120 after screw 128 is inserted. As can be seen from the drawing, dome 600 occupies a significant portion of the top surface area of assembly 100.

Figure 2:
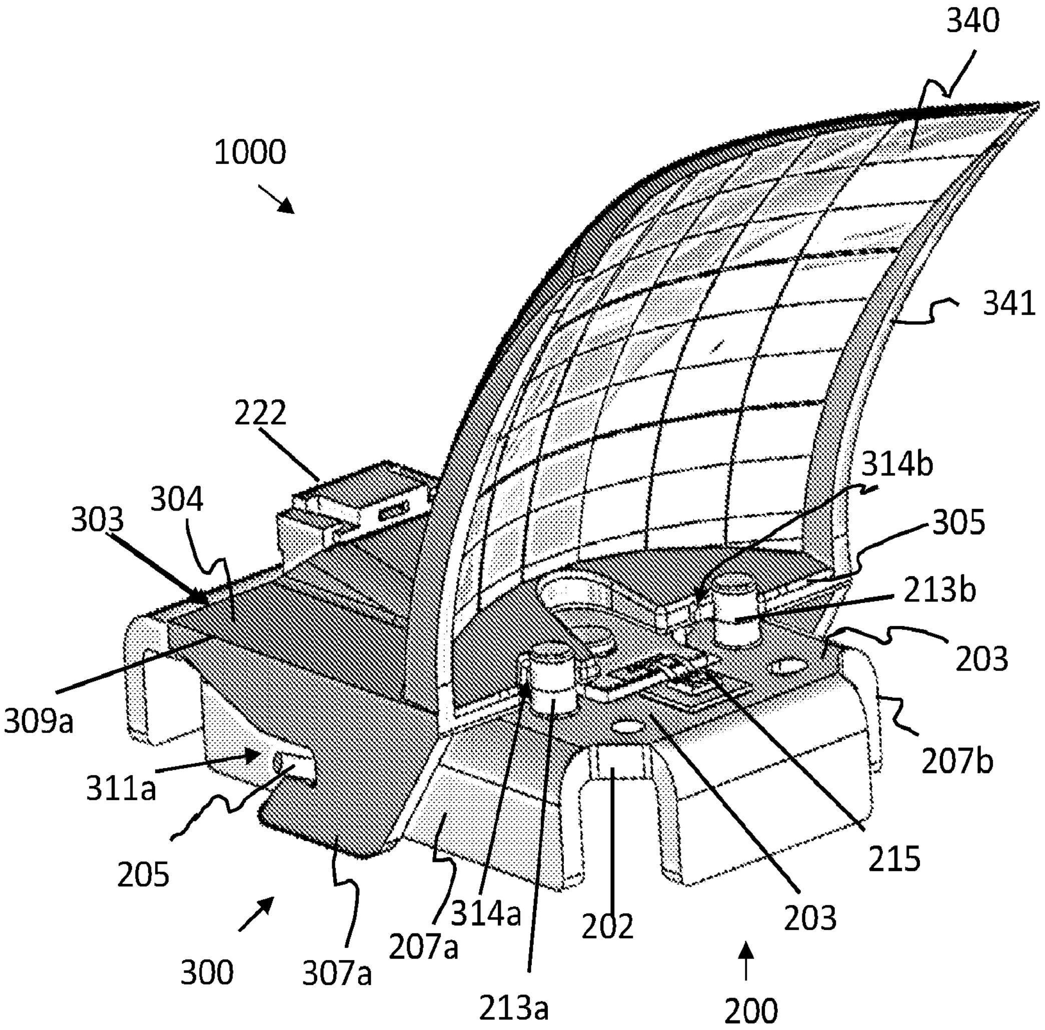
FIG. 2 is a perspective view of an example headlamp assembly.
Figure 3:
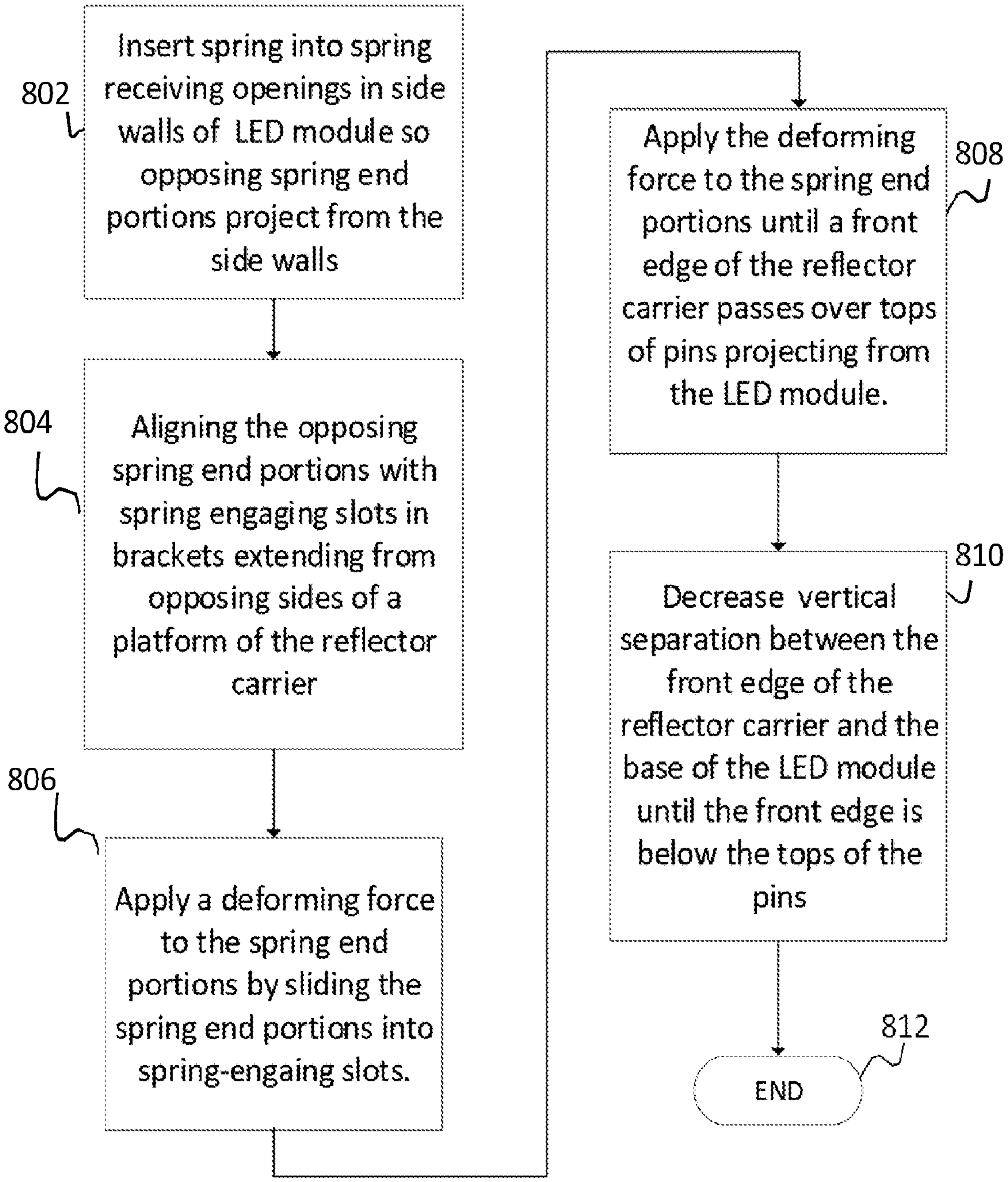
FIG. 3 is a flowchart of a method of assembling the LED module of FIG. 3 to a reflector carrier.

FIG. 2 is a perspective view of a headlamp assembly 1000, as assembled in accordance with the method shown in the flowchart of FIG. 3. Headlamp assembly 1000 includes a reflector carrier 300 and an LED module 200. Significantly, LED module 200 is shown to be coupled to reflector carrier 300 without the use of a screw penetrating reflector carrier 300 and LED module 200.

LED module 200 comprises a base 202. Base 202 has a generally rectangular top planar surface 203 that defines a first plane of LED module 200. Base 202 has opposing side walls 207*a*, 207*b*. Side walls 207*a*, 207*b* extend from opposing sides of base 202 in a direction substantially vertical to the first plane in which top planar surface 203 lies. In the example of FIG. 2 side walls 207*a*, 207*b* define second planes of LED module 200. The second planes are substantially vertical to the first plane. LED module 200 further includes pins 213*a*, 213*b*.

Pins 213*a*, 213*b* project from top surface 203 of base 202 vertical to the first plane and opposite the direction in which side walls 207*a*, 207*b* extend. Pins 213*a*, 213*b* can serve as guides for aligning reflector carrier 300 with LED module 200 and can also serve to limit motion of reflector carrier 300 as will be explained below.

An LED package 215 can be disposed on top surface 203 and may be positioned in a front end portion of top surface 203. LED package 215 can be mounted on a printed circuit board and the printed circuit board can be disposed on top surface 203. A connector 222 and other components can be disposed on top surface 203 of LED module 200. Base 202 can comprise a heat sink to dissipate heat generated by LED package 215 and other components disposed on base 202.

Headlamp assembly 1000 further includes reflector carrier 300. Reflector carrier 300 comprises a platform 303 supporting a reflector 340 supported by a reflector frame 341. In the example of FIG. 2, platform 303 has a generally rectangular top planar surface 304 and a generally rectangular planar bottom surface that defines a first plane of reflector carrier 300. Brackets 307*a*, 307*b* extend from opposing sides 309*a*, 309*b* (not visible in FIG. 2) of platform 303 in a direction substantially vertical to the first plane of reflector carrier 300. In the example of FIG. 2, brackets 307*a*, 307*b* define second planes of reflector carrier 300. The second planes of reflector carrier 300 are substantially vertical to the first plane of reflector carrier 300.

Each bracket 307*a*, 307*b* has a spring engaging slot 311*a*, 311*b*. Spring engaging slots 311*a*, 311*b* are configured to slidingly engage opposing end portions of a spring 205 extending from openings (not shown) in each of the opposing side walls 207*a*, 207*b* of LED module 200. Reflector carrier 300 further includes a front edge 305 extending along a front side of platform 303. Front edge 305 may have recesses 314*a*, 314*b* for receiving pins 213*a*, 213*b*.

FIG. 3 is a flowchart of a method of coupling the LED module 200 shown in FIGS. 2 and 3 to the reflector carrier 300 shown in FIG. 2. The method will be described with reference to FIGS. 3-10.

Figure 4:
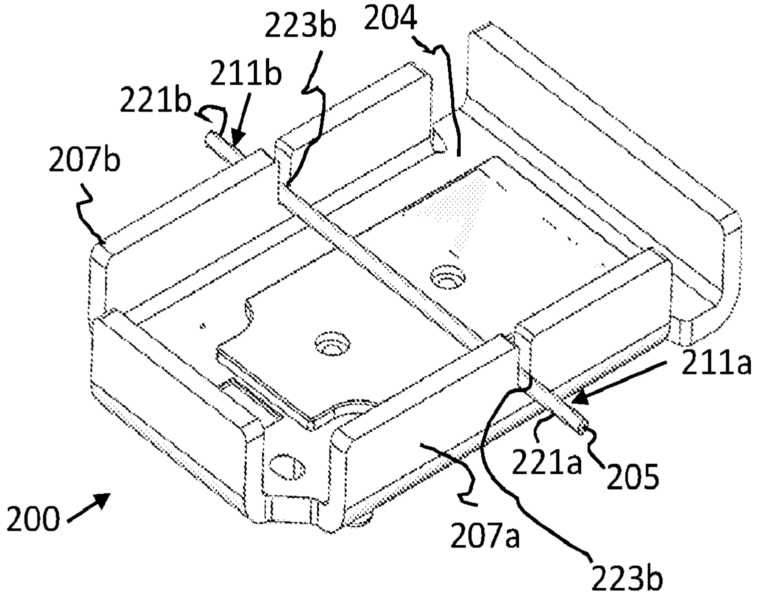
FIG. 4 is a perspective view of an underside of an LED module.

A spring may be inserted into spring-receiving openings in side walls projecting vertically from opposing sides of a base of the LED module so that opposing end portions of the spring project in opposite directions from the side walls (802). FIG. 4 shows an example spring 205 inserted into example spring receiving openings 211*a*, 211*b* formed in example opposing side walls 207*a*, 207*b* of LED module 200. Spring receiving openings 211*a*, 211*b* can have a variety of shapes other than the shape shown in FIG. 4. For example, openings 211*a*, 211*b* can be holes in opposing side walls 207*a*, 207*b*. Any kind of opening that allows opposing end portions of a spring, a rod, or other elongate flexible member to pass through the side walls can be suitable for embodiments within the scope of the embodiments described herein.

When spring 205 is resting in spring receiving openings 211*a*, 211*b*, opposing intermediate portions 223*a*, 223*b* of spring 205 may be in contact with corresponding portions of opposing side walls 207*a*, 207*b* that define each of the openings 211*a*, 211*b*. Opposing end portions 221*a*, 221*b* of spring 205 may extend outwardly in opposite directions from opposing side walls 207*a*, 207*b*.

As shown in FIG. 4, spring 205 is at rest (e.g., in its equilibrium position). Opposing spring end portions 221*a*, 221*b* may become deformed. When that occurs, intermediate portions 223*a*, 223*b* contacting opposing side walls 207*a*, 207*b* at openings 211*a*, 211*b* may apply a force to the LED module 200 in the direction of the applied deforming force (e.g., in the direction in which spring end portions 221*a*, 221*b* deform).

Spring 205 can be a simple spring. However, spring 205 need not necessarily be a spring. For example, spring 205 can include a flexible rod constructed of a flexible alloy such as spring steel. In general, any elongate flexible member such as a shaft, pole, rod or the like could be suitable, as long it can be deformed and also has enough strength to return to its original shape post-deformation. In some examples, spring 205 can be substantially straight in its resting position as illustrated in FIG. 4. Alternatively, spring 205 can have a curved or bent shape in its resting position. Spring 205 can include various other features, for example to prevent spring 205 from becoming lost or inaccessible during assembly or alignment. Regardless of the shape of spring 205 in its equilibrium position, spring 205 may be structured to exert a restoring force in a direction that returns spring 205 to its equilibrium position in response to any deforming force that deforms spring 205 from its equilibrium position.

Figure 5:
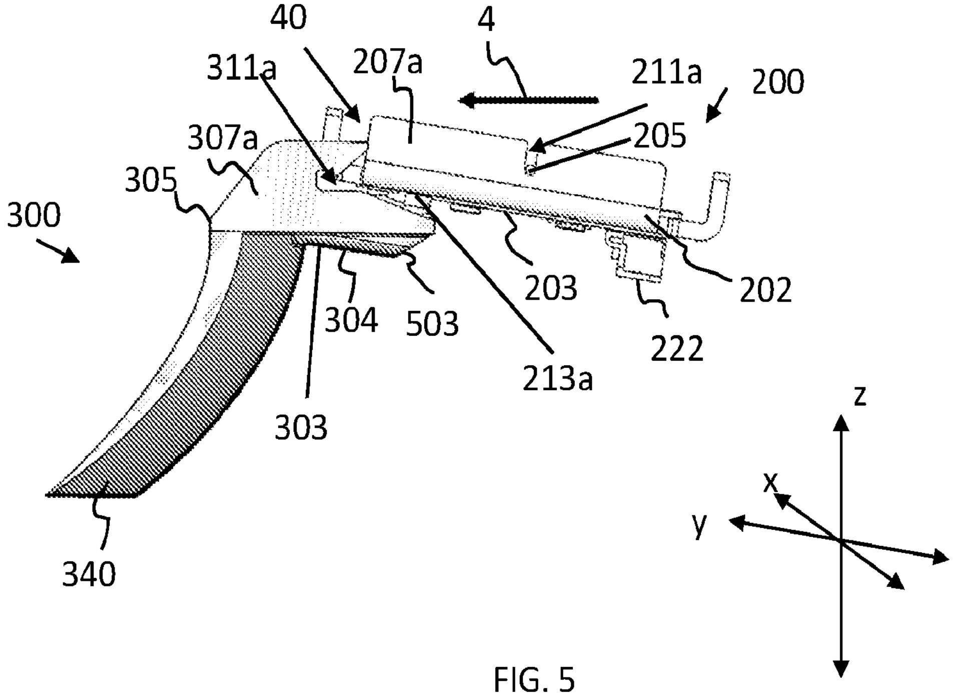
FIG. 5 is a perspective side elevation view of the headlamp assembly shown in FIG. 2.

Returning to FIG. 3, and with reference to FIG. 5, opposing spring end portions 221*a*, 221*b* of spring 205 extending from side walls 207*a*, 207*b* may generally be aligned with opposing spring-engaging slots 311*a*, 311*b* formed in opposing brackets 307*a* and 307*b* (804). The aligning can be performed by positioning LED module 200 with respect to reflector carrier 300 so that platform 303 is generally aligned with base 202 along a longitudinal axis y, with lateral axes x being generally parallel so that LED module 200 can be moved between opposing brackets 307*a*, 307*b* of reflector carrier 300.

In an aligned position, bottom surface 203 of LED module 200 may be facing the bottom surface 201 (best shown in FIG. 9) of platform 303. Base 202 of LED module 200 may be separated from platform 303 by a distance at least sufficient to allow pins 213*a*, 213*b* of LED module 200 to clear bottom surface 201 of platform 303 as LED module 200 moves spring 205 toward spring-engaging slots 311*a*, 311*b* of reflector carrier 300. At this point in the method spring 205 is in its equilibrium or resting position.

In general, LED module 200 and reflector carrier 300 may be aligned by manipulating either one, or both, so they are relatively positioned horizontally and vertically so that LED module can be moved toward reflector carrier 300, or vice versa, to facilitate engaging end portions 221*a*, 221*b* of spring 205 with slots 311*a*, 311*b*.

Figure 6:
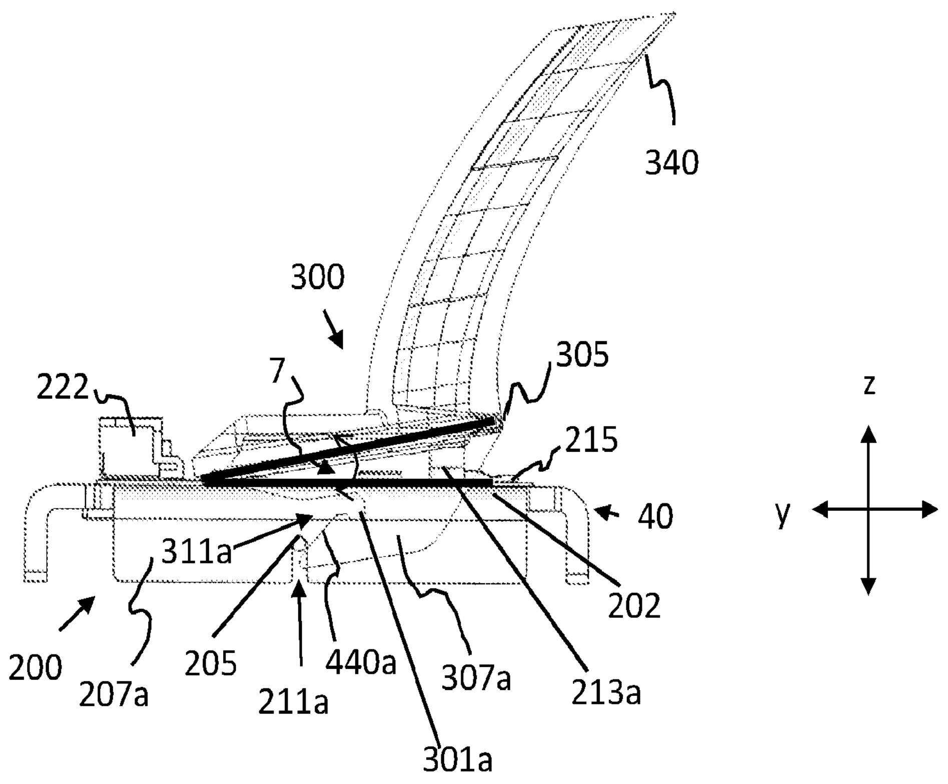
FIG. 6 is a perspective side elevation view of the headlamp assembly shown in FIG. 2.

To bring end portions 221*a*, 221*b* of spring 205 into contact with slots 311*a*, 311*b*, LED module 200 may be aligned in a vertical axis so that front edge 305 of platform 303 is above the top of pins 213*a*, 213*b* as shown in FIG. 6. FIG. 6 shows LED module 200 in a position in which end portions 221*a*, 221*b* of spring 205 in initial contact with slot guides 440*a*, 440*b* (one visible) in brackets 307*a*, 307*b* of reflector carrier 300. Platform 303 and base 202 are shown to be aligned vertically by front edge 305 of platform 303 separated by a distance from base 202 of LED module 200. The distance will be at least greater than a height of pins 213*a*, 213*b* from base 202 of LED module 200. The distance will define an angle 7 between platform 303 of reflector carrier 300 and base 202 of LED module 200.

Angle 7 may be sufficiently wide to ensure front edge 305 of platform 303 is above the top of pins 213*a*, 213*b* thereby allowing front edge 305 to pass over pins 213*a*, 213*b* as opposing end portions 221*a*, 221*b* of spring 205 are engaging with spring-engaging slots 311*a*, 311*b* via guide portions 440*a*, 440*b*. At a point of first contact between end portions 221*a*, 221*b* of spring 205 with guide portions 440*a*, 440*b*, spring 205 is in an equilibrium position.

Returning to FIG. 3, with respect to FIG. 6, reflector carrier 300 may be moved relative to LED module 200 so that opposing end portions 221*a*, 221*b* of spring 205 are forced along guide portions 440*a*, 440*b* toward terminal end portions 301*a*, 301*b* (not visible) of spring-engaging slots 311*a*, 311*b* (806). In example embodiments, terminal end portions of spring engaging slots 311*a*, 311*b* can be equipped with bearings (not shown) to receive spring 205 as spring 205 is moved into the terminal ends 301*a*, 301*b* (not visible).

LED module 200 and reflector carrier 300 may be moved relative to one another so that spring ends portions 221*a*, 221*b* are slidingly engaged in the slots. As this occurs, a deforming force may be applied by sloped guide portions 440*a*, 440*b* to end portions 221*a*, 221*b* in a vertical (+z) direction and in a direction along a longitudinal axis (+y) of base 202 of LED module 200. Therefore, as end portions 221*a*, 221*b* of spring 205 are moved along guide portions 440*a*, 440*b*, spring 205 may begin to deform along the resultant of the deforming forces in the +z and +y directions, bending spring end portions in the resultant direction R.

Figure 7:
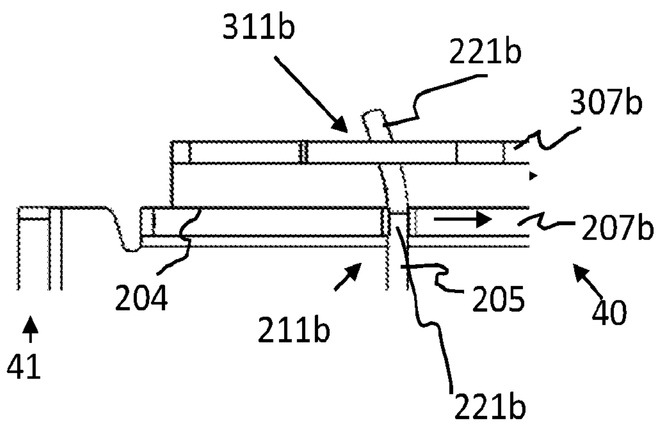
FIG. 7 is a bottom plan view of the headlamp assembly shown in FIG. 2.

FIG. 7 is a bottom plan view of a portion of LED module 200 and reflector retainer 400 as shown in FIG. 6. Opposing intermediate spring portions 221*a*, 221*b* may be in contact with base 202 via openings 211*a*, 211*b* in LED module 200. Spring end portions 221*a*, 221*b* are shown to be bending in response to movement along guide portions 440*a*, 440*b* of slots 311*a*, 311*b* of brackets 307*a*, 307*b*.

As LED module 200 moves in the −y direction, spring end portions 221*a*, 221*b* tend to bend in the +y direction toward a rear portion 41 of base 202, and in the +z direction toward platform 303 of reflector retainer 300 so as to move in a resultant direction +R. (Best illustrated in FIG. 10.) At the same time, spring ends will exert an opposing restoring force on the guide portions in the −R direction. And at the same time, intermediate spring portions 221*a*, 221*b* in contact with base 202 via openings 211*a*, 211*b* will exert a force on base 202 in the +y direction, opposing the movement of base 202 in the −y direction.

It will be understood all movement described herein is relative. In some implementations, LED module 200 and reflector carrier 300 can both be manipulated relative to one another to accomplish the resultant movement. In other implementations, either one of LED module 200 or reflector carrier 300 can be stationary while the other may be moved. At any time during performance of the method, the stationary one can become the moving one and vice versa. For example, in one implementation reflector carrier 300 can be held stationary while LED module 200 may be moved toward reflector carrier 300, with front end 40 of LED module 200 leading.

Returning to FIG. 3, the relative movement between reflector carrier 300 and LED module 200 may be maintained as described above by moving LED module 200 in the −y direction, thereby applying the deforming force to end portions 221*a*, 221*b* of spring 205 (808). This may be continued at least until front edge 305 of reflector carrier 300 passes over pins 213*a*, 213*b* projecting from base 202 of LED module 200.

Figure 8:
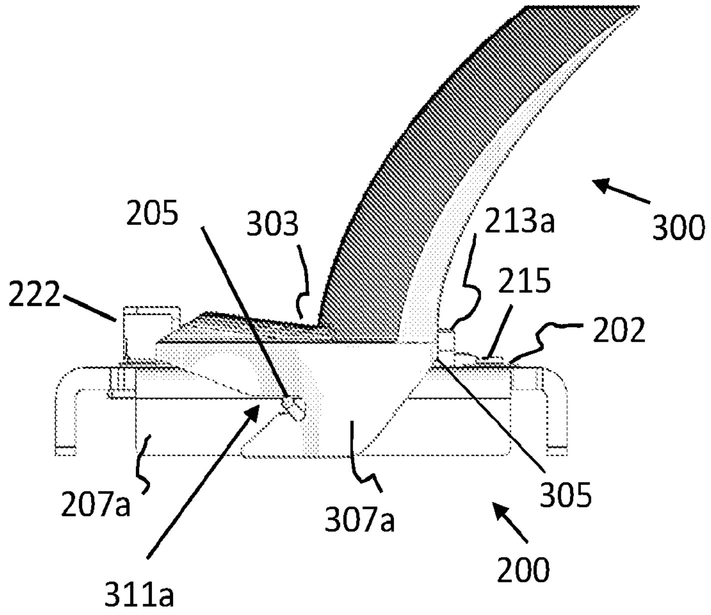
FIG. 8 is a side elevation view of the headlamp assembly shown in FIG. 2.

After front edge 305 clears tops of pins 213*a*, 213*b*, angle 7 (best shown in FIG. 6) may be decreased so that vertical separation between front edge 305 and base 202 decreases, thereby lowering front platform 303 toward base 202 behind pins 213*a*, 213*b**810). FIG. 8 shows front edge 305 of reflector carrier 300 after passing pins 213*a*, 213*b* and after decreasing the vertical separation. In this position front edge 305 is positioned proximal base 202 and pressed against pins 213*a*, 213*b* and spring end portions 221*a*, 221*b* are seated in slots 311*a*, 311*b*.

Figure 9:
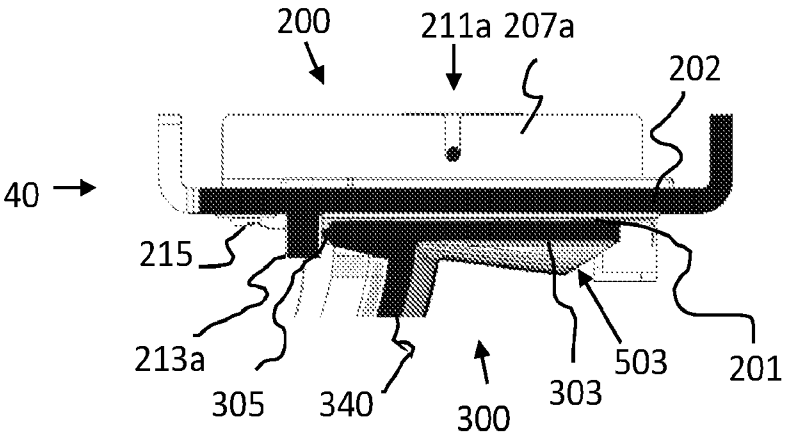
FIG. 9 shows a cross section in a side elevation view of the headlamp assembly shown in FIG. 2.

FIG. 9 is a side cross section that shows relative structural positions of LED module 200 and reflector carrier 300 as a result of performing the action at 808. Base 202 may be substantially parallel to platform 303 and extends past front edge 305 of reflector carrier 300 at a front end 40. Rear edge 503 of platform 303 may be proximal to connector 222. Front edge 305 may be pressed against pins 213*a*, 213*b*.

After performing 808, any forces applied external to the LED module and the reflector carrier to move them to carry out the method can be removed. The LED module and the reflector carrier may now be securely coupled without application of any external forces.

FIG. 10 is a force diagram showing the forces maintaining the coupling of LED module 200 and reflector carrier 300 after performing the method and removing any external forces. Slot 311*a* may exert a deforming force on end portions of spring 205 in the −y and −z directions with the resultant in the −R direction so that spring end portions bend direction −R. The restoring force of spring 205 may act in the +R direction, which tends to move platform 303, including edge 305, in the +y direction, which would restore the spring 205 to equilibrium. However, that motion may be stopped by pins 213*a*, 213*b* of LED module preventing front edge 205 of platform 303 from moving to allow restoration of the spring 205 to its resting position.

At the same time, the bending of end portions of spring 205 may exert a force in the +y direction on base 202 of LED module 200 via contact with openings 211*a*, 211*b* in side walls 207*a*, 207*b*. The restoring force would tend to move base 202 in the −y direction. However, pins 213*a*, 213*b* extending from base 202 may encounter front edge 305 of platform 303 in the −y direction, which may prevent movement of base 202 in the −y direction. The same combination of deforming and restoring forces on spring 205 may act on LED module 200 and reflector carrier 300 in the +z and −z directions to prevent relative movement in the +z and −z directions.

In the position shown in FIG. 10, the forces are in equilibrium and are exerted in a manner that may securely couple LED module 200 to reflector carrier 300. Nonetheless, the flexibility of spring 205 will still allow some small relative movement to accommodate relatively small forces due to environmental factors such as thermal expansion of components.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. In a headlamp assembly, a method of coupling an LED module to a reflector carrier comprising:

inserting a spring into spring-receiving openings in side walls projecting vertically from opposing sides of a base of the LED module so that opposing end portions of the spring project in opposite directions from the side walls;

aligning the opposing spring end portions with spring-engaging slots formed in brackets extending from opposing sides of a platform of the reflector carrier;

applying a deforming force to the spring end portions by moving the LED module to slide the spring end portions into the spring-engaging slots until a front edge of the reflector carrier passes over tops of pins projecting vertically from the base of the LED module; and decreasing a vertical separation between the front edge and the base of the LED module until the front edge is below the tops of the pins.

2. The method of claim 1 wherein the aligning comprises: positioning the LED module with respect to the reflector carrier so that the spring end portions contact sloped guide portions of the spring-engaging slots and the platform of the reflector carrier forms an angle with respect to the base of the LED module, the angle sufficient to position the front edge of the platform above tops of the pins.

3. The method of claim 2, wherein applying a deforming force further comprises: moving the LED module with respect to the reflector carrier so that the sloped guide portions deform the end portions of the spring in a first direction as the end portions slidingly engage the sloped guide portions of the spring-engaging slots.

4. The method of claim 3, further comprising moving the LED module with respect to the reflector carrier so that the spring end portions move from the sloped guide portions into recesses formed at terminal ends of the spring-receiving slots under a restoring force of the spring at the spring end portions.

5. The method of claim 1, further comprising: after lowering the front edge below the tops of the pins, releasing any forces applied external to the LED module and the reflector carrier to perform the method.

6. The method of claim 5 further comprising, after releasing the external forces, maintaining a deforming force on the spring end portions by the pins stopping the front edge from moving to a position that fully restores the spring to its resting position.

7. The method of claim 6, wherein the LED module is held in secure engagement with the reflector carrier by the restoring force of the spring intermediate portions at the base of the LED module being opposed by the spring-engaging slots.

8. The method of claim 1, wherein recesses are formed in the front edge and the method includes aligning the pins with the recesses.

9. The method of claim 1, wherein the reflector carrier is securely coupled to the LED module without perform any step of screwing the LED module to the reflector carrier.

10. The method of claim 2, wherein each of the spring engaging slots includes a bearing at terminal ends of the slots, and wherein the method includes continuing to move the LED module relative to the reflector carrier after the spring ends come into contact with bearings.

11. The method of claim 1, wherein the LED module coupled to the reflector carrier forms a headlamp assembly and the method further comprises, disposing the headlamp assembly in a vehicle.

12. The method of claim 1, wherein the method is performed manually by a human without applying torque to the LED module or the reflector carrier.

13. The method of claim 1, wherein the method is performed automatically by a machine.

14. A headlamp assembly comprising:

an LED module comprising a base and opposing side walls projecting vertically from opposing sides of the base, each opposing side wall having a spring-receiving opening formed therein;

a spring disposed at least partially between the opposing side walls of the LED module with end portions of the spring projecting in opposite directions from the side walls of the LED module; and a reflector carrier comprising a platform including a front edge portion and opposing brackets extending from opposing sides of the platform, each opposing bracket having a spring-engaging slot formed therein, wherein the LED module is disposed at least partially between the opposing brackets of the reflector carrier with the end portions of the spring extending through the spring-engaging slots in the opposing brackets whereby forces applied by the spring in the Y- and Z-direction mechanically couple the LED module to the reflector carrier.

15. The headlamp assembly of claim 14, further comprising pins projecting vertically from the base of the LED module in a direction opposite the direction in which the opposing side walls extend from the base.

16. The headlamp assembly of claim 14, further comprising a spring-guiding bearing disposed in each spring-receiving opening.

17. The headlamp assembly of claim 14, further comprising a spring disposed in the base so that opposing spring end portions extend from the opposing side walls via the spring receiving opening formed in each side wall.

18. The headlamp assembly of claim 14, wherein the opposing spring end portions are disposed in opposing spring engaging slots formed in each opposing bracket of the reflector carrier.

19. The headlamp assembly of claim 14, further including recesses formed in the front edge of the reflector carrier wherein the pins are disposed within the recesses.

20. A method of assembling a headlamp comprising:

inserting a spring into spring-receiving openings in side walls projecting vertically from opposing sides of a base of an LED module so that opposing end portions of the spring project in opposite directions from the side walls;

engaging the opposing spring end portions with spring-engaging slots formed in brackets extending from opposing sides of a platform of a reflector carrier;

applying a deforming force to the spring end portions via the spring-engaging slots until a front edge of the reflector carrier passes over tops of pins projecting vertically from the base of the LED module; and decreasing a vertical separation between the front edge and the base of the LED module until the front edge is below the tops of the pins.

* * * * *